(12) United States Patent
Tsuyuki et al.

(10) Patent No.: US 6,672,527 B2
(45) Date of Patent: Jan. 6, 2004

(54) STRUCTURE FOR IDENTIFYING A RECORDING MEDIUM CARTRIDGE

(75) Inventors: Seiji Tsuyuki, Kanagawa-ken (JP); Daisuke Takahashi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/153,795

(22) Filed: May 24, 2002

(65) Prior Publication Data

US 2002/0179763 A1 Dec. 5, 2002

(30) Foreign Application Priority Data

May 30, 2001 (JP) ........................ 2001-162357

(51) Int. Cl.[7] .............................................. G11B 23/02
(52) U.S. Cl. ...................... 242/344; 360/132
(58) Field of Search ................... 242/348, 344, 242/357; 360/132

(56) References Cited

U.S. PATENT DOCUMENTS

| | | | | |
|---|---|---|---|---|
| 4,734,812 A | * | 3/1988 | Tanaka et al. | 360/132 |
| 5,218,502 A | * | 6/1993 | Tanaka et al. | 360/132 |
| 6,452,746 B1 | * | 9/2002 | Sasaki et al. | 360/132 |
| 6,490,132 B1 | * | 12/2002 | Kano et al. | 360/132 |

FOREIGN PATENT DOCUMENTS

| | | |
|---|---|---|
| EP | 0 669 618 A2 | 8/1995 |
| EP | 1 170 746 A1 | 1/2002 |

* cited by examiner

*Primary Examiner*—William A. Rivera
(74) *Attorney, Agent, or Firm*—Sughrue Mion, PLLC

(57) ABSTRACT

In a recording medium cartridge in which a recording medium is housed within a cartridge case, a write protection member is installed in the opening of the cartridge case to inhibit data from being written to the recording medium. The write protection member is provided with a recognition window. Within the cartridge case, identification display is installed so that it is visible through the recognition window.

6 Claims, 7 Drawing Sheets

STRUCTURE FOR IDENTIFYING A RECORDING MEDIUM CARTRIDGE

BACKGROUND OF THE INVENTION

1. Field of the Invention

The present invention relates to a structure for identifying a magnetic tape cartridge in which a recording medium such as magnetic tape is housed within a cartridge case.

2. Description of the Related Art

For example, a recording medium cartridge housing a magnetic tape for computer external storage units, and a recording medium cartridge housing a recording medium such as other magnetic recording mediums, an optical recording medium, etc., are in wide use for various purposes.

There are cases where, in these recording medium cartridges, a recording medium with increased recording capacity by an enhancement in recording density is housed in a cartridge case of the same shape, thus assuring interchangeability. In these circumstances, however, a change in the shape of the existing cartridge cases is desired to enable discrimination among cartridges of differing densities.

In the recording medium cartridges mentioned above, a write protection member movable between a write enable position and a write inhibition position is installed so that data is not written to the recording medium inadvertently.

In the case where the color and shape of components are greatly changed to identify a recording medium cartridge with increased recording capacity, it is troublesome to fabricate the recording medium cartridge while continuing to fabricate the existing cartridges. In addition, the number of components is increased and the management becomes troublesome.

Furthermore, there are cases where head-cleaning tape is housed in the same cartridge, and there is also a need to distinguish the recording medium cartridge from the head-cleaning cartridge.

SUMMARY OF THE INVENTION

The present invention has been made in view of the circumstances mentioned above. Accordingly, it is the primary object of the present invention to provide a magnetic tape cartridge that can be identified by a write protection member.

To achieve this end, there is provided a structure for identifying a recording medium cartridge in which a recording medium is housed within a cartridge case. The structure has an opening formed in the cartridge case; a write protection member, installed in the opening, for inhibiting data from being written to the recording medium; a recognition window formed in the write protection member; and identification display, installed within the cartridge case, which is visible through the recognition window.

When the write protection member is at a write enable position, the recognition window of the write protection member faces the opening of the cartridge case so that the identification display can be recognized.

The aforementioned identification display is provided so that it can be visually observed by color display or symbol display, performed on the cartridge case by putting leaf, printing, or a relief. Note that in the aforementioned opening of the cartridge case, an immovable pseudo write protection member may be installed to identify a recording medium cartridge in which head-cleaning tape is housed.

According to the present invention, the write protection member disposed in the opening of the cartridge case is provided with a recognition window, and the identification display installed within the cartridge case is visible through the recognition window. With this arrangement, the recording capacity, etc., of a recording medium can be identified through use of a simpler structure. In addition, by changing only the identification display without changing the write protection member, various kinds of identification can be achieved.

A recording medium cartridge housing head-cleaning tape may be identified by installing a write protection member so that it cannot be moved. In this case, a clear discrimination can be made between a recording medium cartridge housing a recording medium and a recording medium cartridge housing head-cleaning tape.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
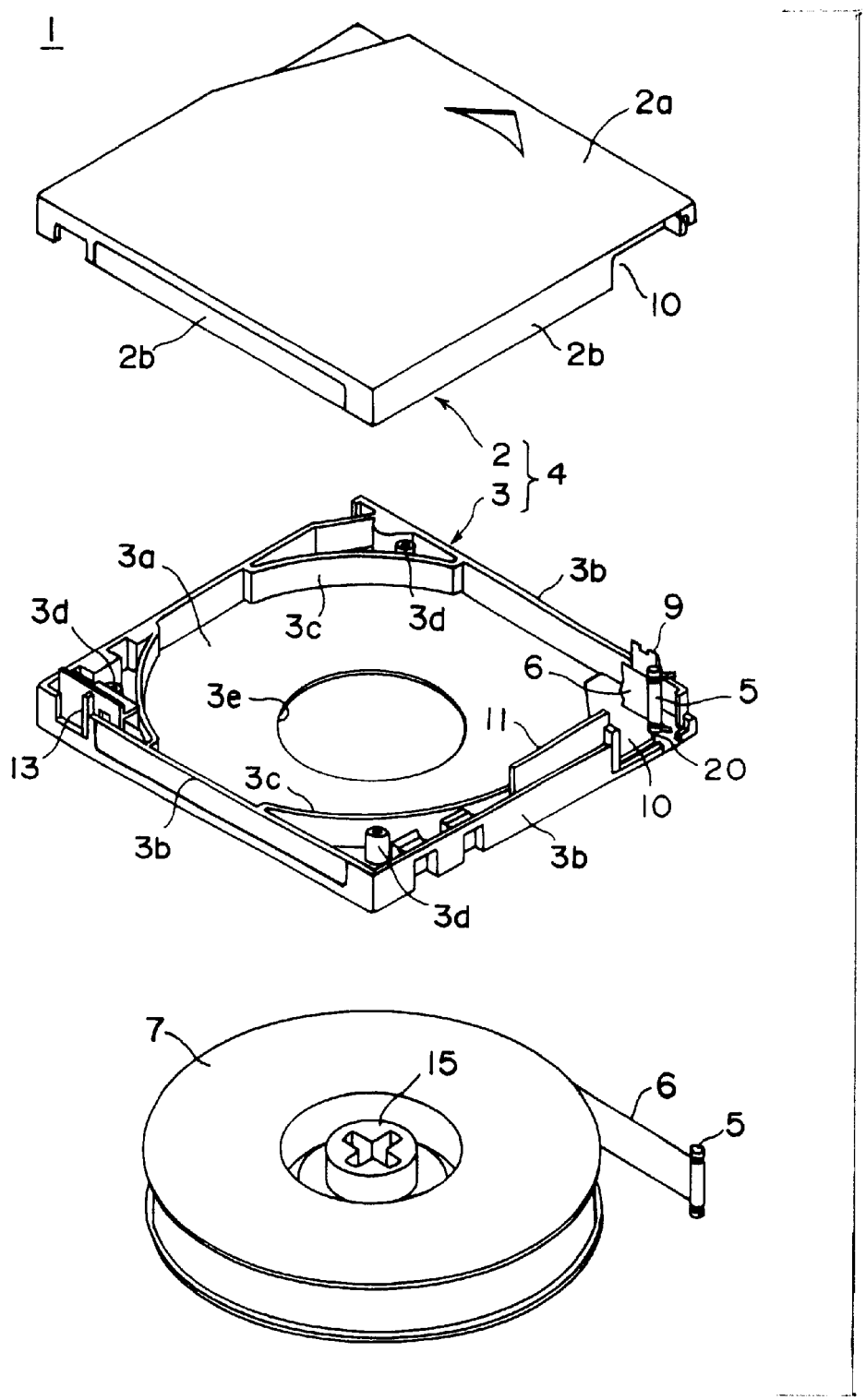
FIG. 1 is an exploded perspective view of a recording medium cartridge according to a preferred embodiment of the present invention.

Referring to FIG. 1, a recording medium cartridge is shown in accordance with a preferred embodiment of the present invention. The recording medium cartridge in the preferred embodiment is a magnetic tape cartridge in which a single tape reel with magnetic tape (which is a recording medium for computer external storage units) wound thereon is housed.

The magnetic tape cartridge 1 has a cartridge case 4, which is formed by fastening an upper shell 2 and a lower shell 3 together with small screws, etc. Within the cartridge case 4, a single tape reel 7 with magnetic tape 6 wound thereon is rotatably housed. The magnetic tape 6 has a leader pin 5 firmly attached to the leading end thereof. The side walls of the upper and lower shells 2, 3 have a lead-out opening 10 through which the leader pin 5 is pulled in and out of the cartridge case 4. Near this lead—out opening 10, there is provided a slide door 11 that is opened and shut. The slide door 11 is urged in a closing direction by elastic means (not shown).

In the non-operative state in which the magnetic tape 6 is completely wound on the tape reel 7, the leader pin 5 is held in upper and lower recesses 20 formed near the lead-out opening 10. The leader pin 5 is detachably held in the recesses 20 by a pin locking member 9, which is constructed of a plate spring. The leader pin 5 is pulled out of the magnetic tape cartridge 1 by the drive means of a recording/reproducing unit (not shown) and is pulled in the unit. Within the recording/reproducing unit, the magnetic tape 6 is forwarded or rewound. In this manner, recording or reproduction is performed by the magnetic head.

Figure 2:
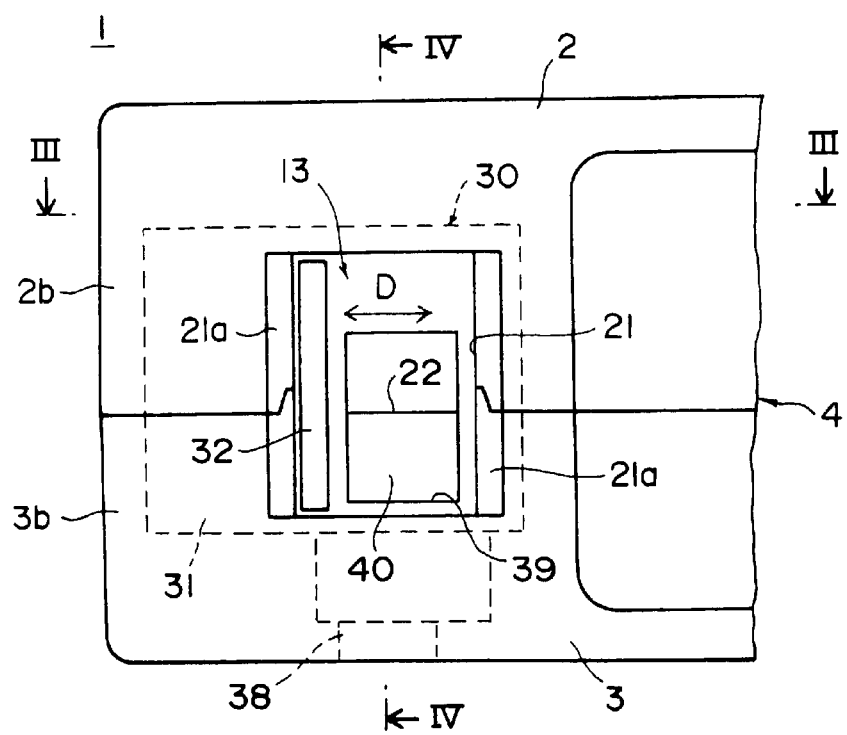
FIG. 2 is a front view showing how the write protection member of FIG. 1 is installed.
Figure 3:
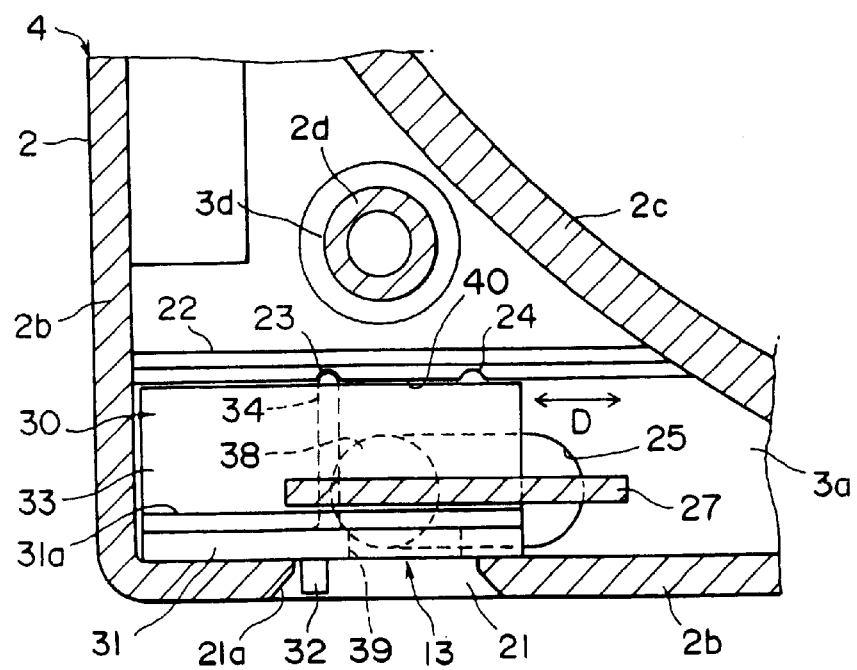
FIG. 3 is a sectional plan view taken substantially along line III—III of FIG. 2.

In a control opening 21 (see FIG. 2) in the rear end of the cartridge case 4, a write protection member 13 (that is to be described in detail later) is slidably disposed, allowing the identification display to be viewed when the write protection member 13 is slid to the write enable position.

Figure 4:
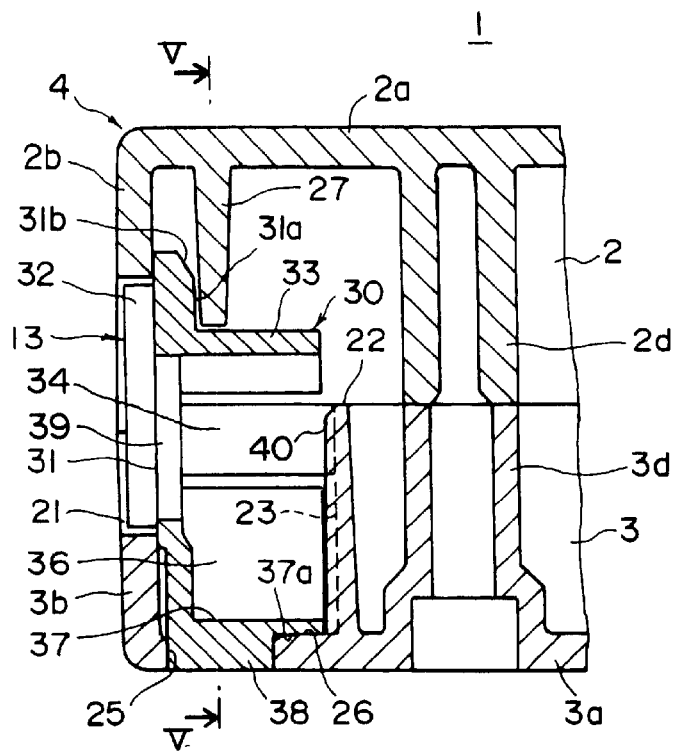
FIG. 4 is a sectional side view taken substantially along line IV—IV of FIG. 2.
Figure 5:
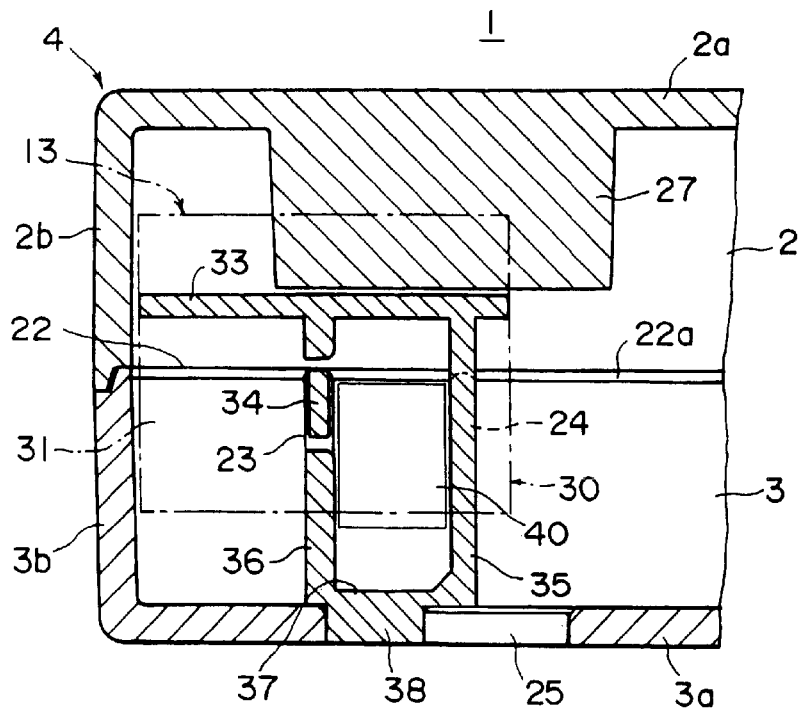
FIG. 5 is a sectional front view taken substantially along line V—V of FIG. 4.

In FIG. 1, the upper and lower shells 2, 3 are approximately rectangular in shape and are provided with side walls 2b, 3b along the perimeters of the top wall 2a and the bottom wall 3a. The upper and lower shells 2, 3 are further provided with circular arc walls 2c, 3c (see FIGS. 1 and 2) along the outer periphery of the tape reel 7, respectively. As shown in FIG. 4, the lower shell 3 is fastened to the upper shell 2 by abutting the boss portions 3d of the lower shell 3 with the boss portions 2d of the upper shell 2 and then tightening small screws through the bottom surface 3a of the lower shell 3. The lower shell 3 has a center hole 3e through which the tape reel 7 is driven by the driving shaft of the drive means of a recording/reproducing unit (not shown). The center portion of the tape reel 7 is provided with a rotation regulating mechanism 15 for restricting rotation of the tape reel 7 during non-use of the magnetic tape cartridge 1.

Although not shown, the tape reel 7 has a reel plate mounted on the central portion of the bottom surface thereof. The reel plate is used to attract and hold a magnet type rotation-drive member. The radially outer portion of the bottom surface of the tape reel 7 has a reel gear that meshes with the driving gear of the magnet type rotation-drive member. If the driving gear of the magnet type rotation-drive member meshes with the reel gear of the tape reel 7, the rotation regulating mechanism 15 performs an unlocking operation to make the tape reel 7 free to rotate.

The write protection member 13 and the structures for installation and identification will hereinafter be described in detail with reference to FIGS. 2 to 9.

In one end portion of one side surface (rear end surface with respect to the direction in which the cartridge case 4 is inserted) of the cartridge case 4, the aforementioned control opening 21 that is approximately rectangular in shape is formed in the upper shell 2 and the lower shell 3. Inside the control opening 21, the write protection member 13 is disposed so that it is slidable in a sliding direction D along the side walls 2b, 3b of the upper and lower shells 2, 3.

The write protection member 13 is equipped with a sliding main body 30, which has a certain degree of length in the sliding direction D, depth, and height. The sliding main body 30 has a flat main wall 31 extending in the sliding direction D along the side walls 2b, 3b of the upper and lower shells 2, 3. The main wall 31 has a control rib 32 extending vertically at approximately the central portion of the outside surface thereof. The main wall 31 further has a recognition window 39 near the control rib 32.

Figure 6:
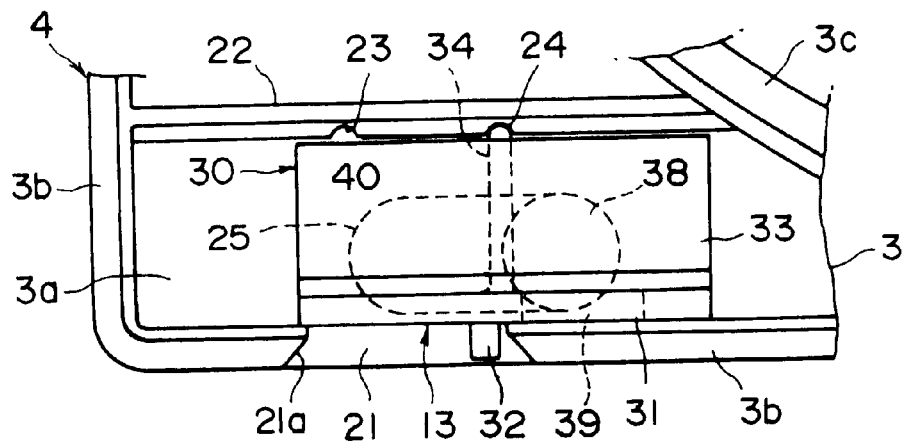
FIG. 6 is a fragmentary plan view showing the state in which the write protection member has been moved, the upper shell of the cartridge case having been removed to show the write protection member.
Figure 7:
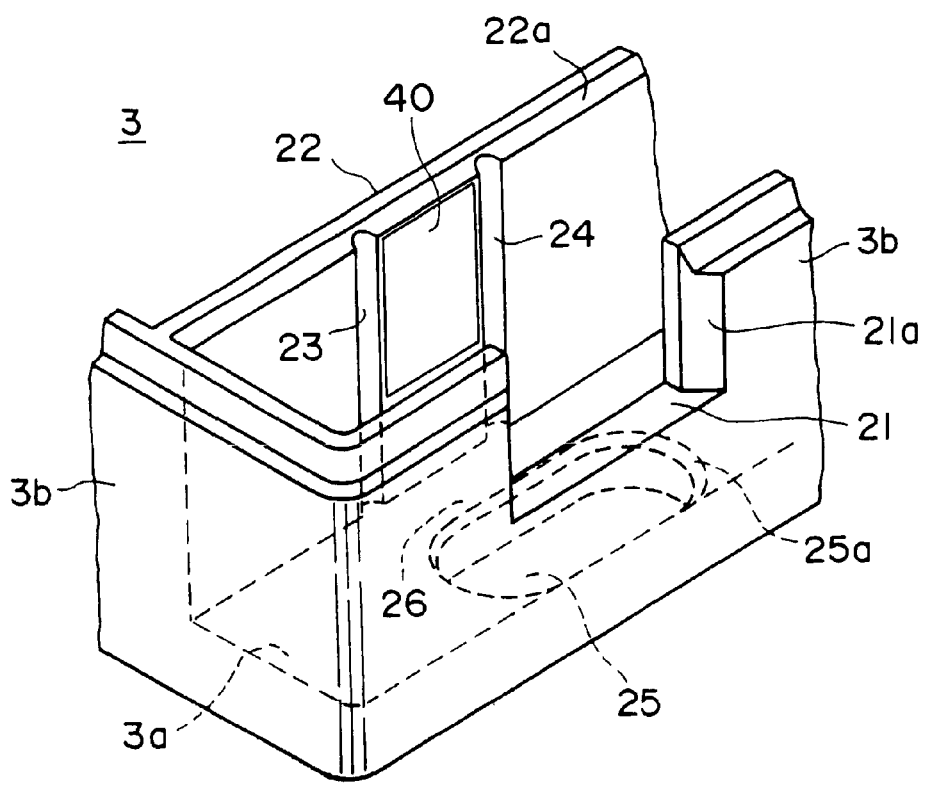
FIG. 7 is a fragmentary perspective view of the lower shell of the cartridge case.
Figure 8:
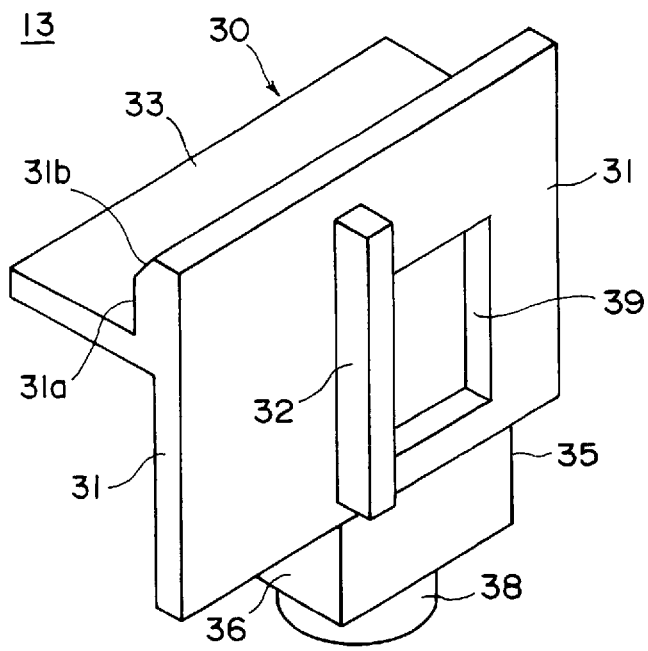
FIG. 8 is a perspective view showing the top structure of the write protection member.

Within the control opening 21, the control rib 32 is horizontally movable between a write enable position shown FIGS. 2 to 5 and a write inhibition position shown in FIG. 6. That is, the control rib 32 positioned within the control opening 21 is moved in the right or left direction with a finger. Near the left and right edges of the control opening 21, inclined faces 21a are formed so that the control rib 32 being positioned at the left or right edge of the control opening 21 can be easily held with a finger.

The main body 30 further has a horizontal wall 33 and a stopper piece 34. The horizontal wall 33 is provided on the upper portion of the inside surface of the main wall 31, and the stopper piece 34 is provided below the horizontal wall 33 and extends inward from the inside surface of the main wall 31 in a direction approximately perpendicular to the sliding direction D. On the other hand, the lower shell 3 of the cartridge case 4 is provided with a guide wall 22 extending in the sliding direction D in parallel with the side wall 3b in which the control opening 21 is formed. The guide wall 22 is elastically deformable so that its upper portion can be bent. The side surface of the guide wall 22 has a first vertical stopper groove 23 and a second vertical stopper groove 24 at positions corresponding to the write enable position and write inhibition position of the write protection member 13. The first stopper groove 23 and the second stopper groove 24 are formed parallel to each other. The stopper piece 34 of the write protection member 13 is received and locked in the first or second stopper groove 23 or 24. The stopper piece 34 is provided so that it abuts the upper end portion of the guide wall 22 whose elastic deformation is great. The guide wall 22 has an inclined face 22a at its upper edge to facilitate insertion of the write protection member 13.

Figure 9:
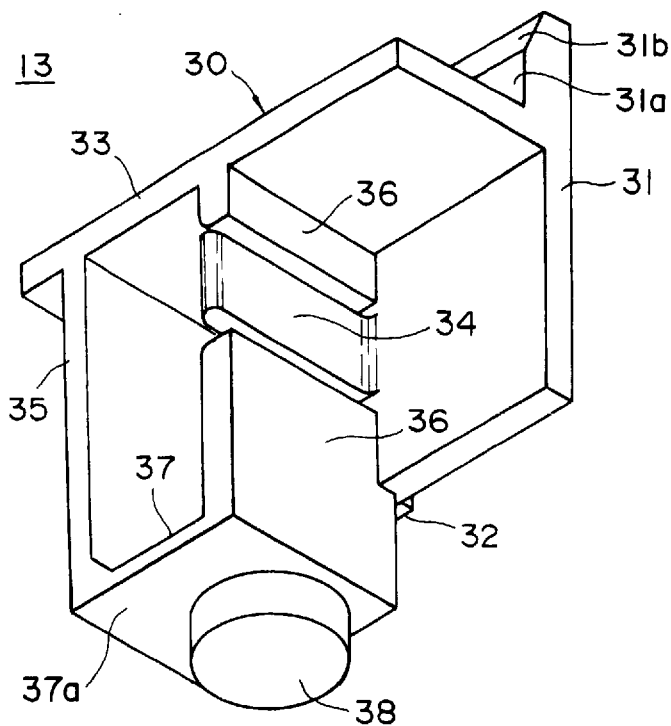
FIG. 9 is a perspective view showing the bottom structure of the write protection member.
Figure 10:
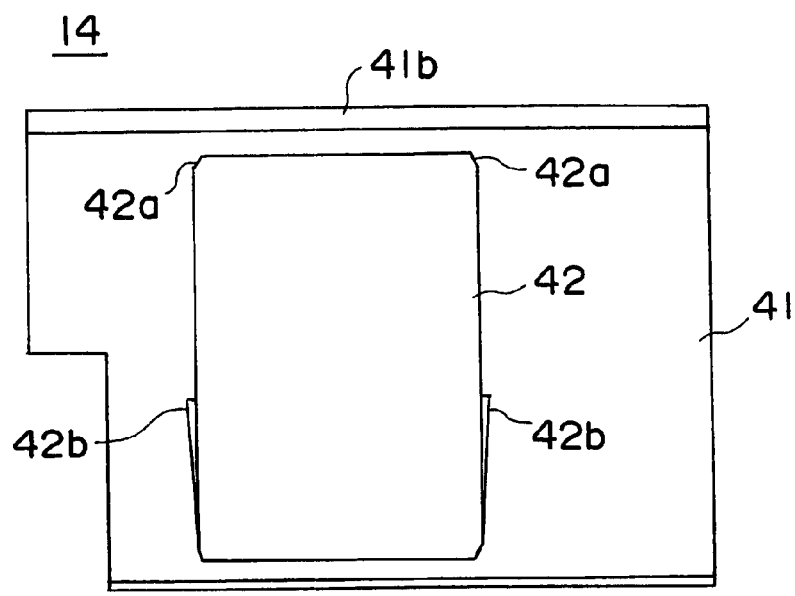
FIG. 10 is a front view showing a pseudo write protection member.
Figure 11:
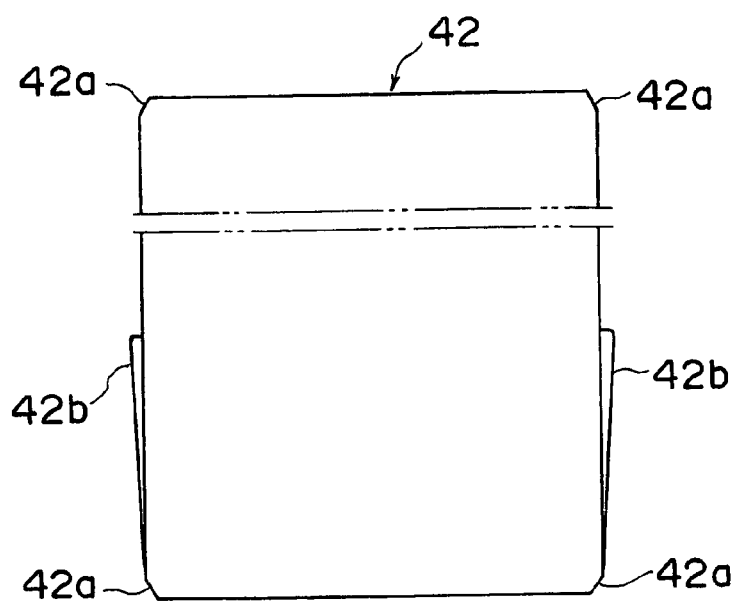
FIG. 11 is an enlarged front view of the essential part of the pseudo write protection member.
Figure 12:
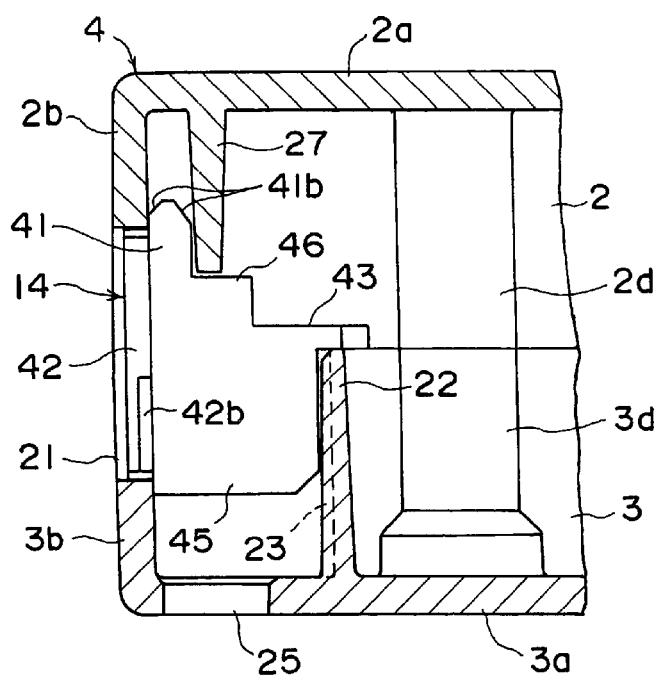
FIG. 12 is a sectional side view of the pseudo write protection member installed in a cartridge case.
Figure 13:
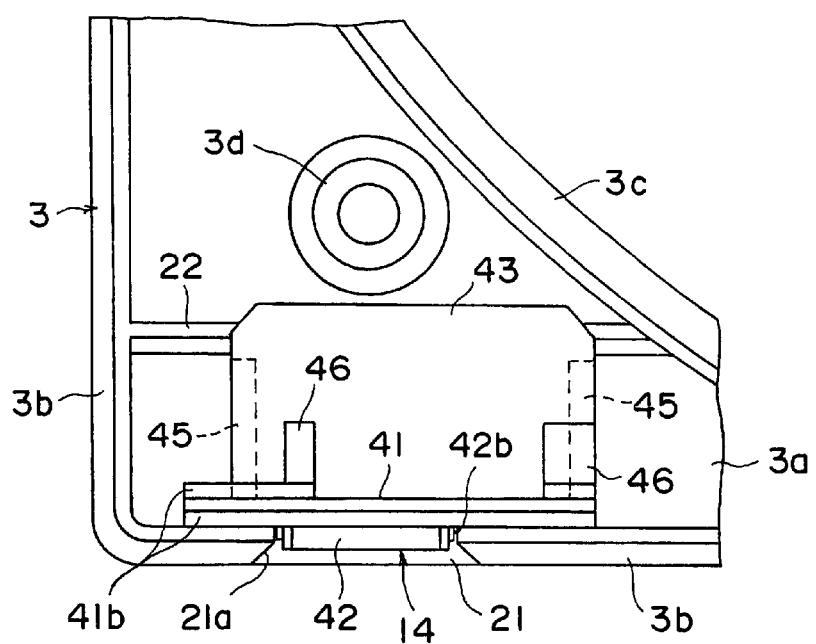
FIG. 13 is a plan view of the pseudo write protection member installed in the lower shell of the cartridge case.

A first vertical wall 35 and a second vertical wall 36, vertically erected in the inside surface of the main wall 31, are provided on the bottom surface of the horizontal wall 33 of the main body 30 so that they are parallel to each other (see FIG. 9). The rear end faces of the first and second vertical walls 35, 36 are provided in close proximity to the side wall of the guide wall 22. The second vertical wall 36 is divided into three parts, and the central part of the three is formed as the aforementioned stopper piece 34. The stopper piece 34 is made thin and formed so that the outer end thereof projects beyond the rear end faces of the horizontal wall 33, the first vertical wall 35, and the second vertical wall 36. The rear end of the stopper piece 34 that is fitted in the stopper groove 23 or 24 is formed into a curved face (R-face).

The aforementioned recognition window 39 is formed in the main wall 31 between the first vertical wall 35 and the second vertical wall 36 so that the side surface of the guide wall 22 can be recognized. When the write protection member 13 is at the write enable position, the recognition window 39 faces the control opening 21 of the cartridge case 4. On the surface of the guide wall 22 between the first and second stopper grooves 23 and 24, which is visible via the recognition window 39, identification display 40 is provided.

The identification display 40 is identified by color display, symbol display, etc., performed on the guide wall 22 according to recording capacity, etc., by putting leaf, printing, a relief, etc. This identification display 40 is provided so that it can be recognized by visual observation. Note that the display range may be enlarged, by extending the guide wall 22 of the lower shell 3 upward or providing on the upper shell 2 an additional guide wall which connects to the upper portion of the guide wall 22 of the lower shell 3, and further providing identification display there.

The bottom ends of the first vertical wall 35 and second vertical wall 36 extending downward beyond the main wall 31 are connected by a horizontal bottom wall 37. The bottom surface of the bottom wall 37 is provided with a cylindrical protrusion 38. On the other hand, the bottom wall 3a of the lower shell 3 is provided with an elongated bottom window 25 extending in the sliding direction D of the write protection member 13. The aforementioned protrusion 38 is inserted into the bottom window 25 and movable within the bottom window 25. The bottom window 25 has an inclined face 25a (see FIG. 7) at the upper edge so that the protrusion 38 can be easily inserted. The bottom window 25 is formed in the vicinity of the side wall 3b of the lower shell 3, and the bottom wall 3a, on the side of the guide wall 22, of the lower shell 3 has a sliding surface 26 along the bottom window 25. The sliding surface 26 of the bottom wall 3a of the lower shell 3 is contacted by a sliding surface 37a, provided on the bottom surface of the bottom wall 37 of the main body 30 of the write protection member 13.

The upper portion of the main wall 31 of the main body 30 of the write protection member 13, extending upward beyond the horizontal wall 33, is formed thicker than the lower portion of the main wall 31. The inside surface 31a of the upper portion of the main wall 31 extends in the sliding direction D of the write protection member 13 and has an inclined face 31b at the upper edge thereof. On the other hand, the top wall 2a of the upper shell 2 is provided with a regulating rib 27 extending downward and along the sliding direction D of the sliding main body 30. When the control rib 32 of the write protection member 13 is pushed toward the inside of the cartridge case 4, the inside surface 31a of the main body 31 of the write protection member 13 is brought into contact with the regulating rib 27 of the upper shell 2. When the control rib 32 of the write protection member 13 is pushed upward, the top surface of the horizontal wall 33 of the write protection member 13 is brought into contact with the bottom surface of the regulating rib 27 of the upper shell 2. In this way, the rearward movement and the upward movement of the main body 30 of the write protection member 13 are regulated by the regulating rib 27 of the upper shell 2.

When the write protection member 13 constructed as described above is assembled into the cartridge case 4, the lower shell 3 is first placed with the top upward. Then, the bottom protrusion 38 of the write protection member 13 is inserted into the bottom window 25 of the bottom wall 3a of the lower shell 3, with the stopper piece 34 of the write protection member 13 fitted in the first stopper groove 23 (or the second stopper groove 24) of the guide wall 22. At the same time, the control rib 32 of the write protection member 13 is inserted into the control opening 21. In the inserting step, the insertion of the write protection member 13 is guided and facilitated by the inclined face 22a of the guide wall 22 and the inclined face 25a of the bottom window 25 of the lower shell 3. Next, the upper shell 2 is stacked on the lower shell 3, and they are fastened together. In the assembling step, the upper shell 3 is similarly guided by the inclined face 31b of the write protection member 13. In this manner, reliable assembling can be performed.

According to the preferred embodiment, when the write protection member 13 is at the write enable position (FIGS. 2 to 5), the stopper piece 34 of the write protection member 13 is fitted in the first stopper groove 23 of the guide wall 22 and the write protection member 13 is held and locked at the write enable position. In this state, the bottom protrusion 38 of the write protection member 13 is positioned at one end of the bottom window 25 of the lower shell 3, and the control rib 32 of the write protection member 13 is positioned at one end of the control opening 21. These positions indicate that the write protection member 13 is at the write enable position. This state is detected by a sensor provided in the cartridge drive unit (not shown), and based on the detection, writing by the magnetic head is allowed.

In addition, when the write protection member 13 is situated at the write enable position, the recognition window 39 of the main wall 31 of the write protection member 13 faces the control opening 21 of the cartridge case 4. The identification display 40 provided on the side surface of the guide wall 22 is visually observed via the recognition window 39, and recording capacity, etc., are identified and recognized.

Next, in the case where the write protection member 13 is moved to protect data recorded on the magnetic tape 6, the write protection member 13 is slid to the opposite side by moving the control rib 32 with a finger. Since the outer end of the stopper piece 34 of the write protection member 13 has been fitted in the first stopper groove 23 of the guide wall 22, the stopper piece 34 is pushed against the guide wall 22. As a result, the guide wall 22 is elastically deformed and the stopper piece 34 is disengaged from the first stopper groove 23. The stopper piece 34 is slid toward the second stopper groove 24 along the wall surface of the guide wall 22. When the stopper piece 34 reaches the second stopper groove 24, the outer end of the stopper piece 34 is fitted in the second stopper groove 24. The deformed guide wall 22 returns to its original state, whereby the write protection member 13 is stopped and held at the write inhibition position. In this state, the bottom protrusion 38 of the write protection member 13 is positioned at the other end of the bottom window 25 of the lower shell 3, and the control rib 32 of the write protection member 13 is positioned at the other end of the control opening 21. These positions indicate that the write protection member 13 is situated at the write inhibition position. This state is detected by the sensor of the cartridge drive unit (not shown), and based on the detection, writing by the magnetic head is inhibited.

If the write protection member 13 is moved to the write inhibition position, as described above, the recognition window 39 of the main wall 31 of the write protection member 13 is moved from the control opening 21 to inside the side walls 2b, 3b of the upper and lower shells 2, 3. In the state in which the write protection member 13 is situated at the write protection position, writing of data has already been performed according the recording capacity, etc., and therefore the user does not need to identify recording capacity, etc., when reproducing data.

FIGS. 10 to 13 show a pseudo write protection member 14 installed in the aforementioned control opening 21 in the case of a cartridge case 4 in which a reel 7 with head-cleaning tape (not shown) instead of magnetic tape 6 is housed. The upper and lower shells 2, 3 of the cartridge case 4 are constructed the same as the aforementioned case and therefore the same reference numerals are applied to the same parts.

The pseudo write protection member 14 is installed so that it cannot be slid. The cartridge for cleaning a magnetic head is identified by the installation. This pseudo write protection member 14 has a main wall 41 in the form of a flat plate extending along the side walls 2b, 3b of the upper and lower shells 2, 3. The outside surface of the main wall 41 is provided with a rectangular protruding portion 42 having nearly the same size and shape as a control opening 21. The 4 (four) corners of the protruding portion 41 are chamfered as shown at 42a. The protruding portion 41 also has wedge ribs 42b on the lower portions of both side faces thereof.

The inside surface of the main wall 41 is provided with a horizontal wall 43, which is provided so that the bottom surface of the rear portion of the horizontal wall 43 engages with the top end of the guide wall 22 of the lower shell 3. Both side portions of the horizontal wall 43 are provided with vertical walls 45. The rear ends of the vertical walls 45 are in close proximity to the side surface of the guide wall 22. The horizontal wall 43 also has protrusions 46 at both ends of the top surface thereof. The protrusions 46 are arranged in close proximity to the lower end of the regulating rib 27 of the upper shell 2. Furthermore, the main wall 41 has front and rear inclined faces 41b at its upper end.

The width of the protruding portion 42 of the main wall 41 is smaller than that of the control opening 21 and formed so that there is a predetermined gap therebetween, and the projected amount of the wedge rib 42b is gradually increased from its lower end toward its upper end. The width of the protruding portion 42, including the upper ends of both wedge ribs 42b, reduces the predetermined gap. Therefore, if the protruding portion 42 is positioned with respect to the central portion of the control opening 21, chatter of the pseudo write protection member 14 against the cartridge case 4 is reduced and assembling is easily performed.

When the pseudo write protection member 14 is installed in the lower shell 3, the insertion of the protruding portion 42 into the control opening 21 is guided by the lower chamfered corners 42a and becomes easy. In addition, with the insertion of the wedge ribs 42b, the protruding portion 42 of the pseudo write protection member 14 is positioned at approximately the center of the control opening 21. When the upper shell 2 is stacked on the lower shell 3 and assembled, the upper shell 2 is easily guided without interfering with the pseudo write protection member 14, because the upper corners 42a are chamfered and the protruding portion 42 is positioned at the center of the control opening 21. In addition, the upper shell 2 is guided by the inclined faces 41b of the upper end of the main wall 41. Thus, assembling can be easily performed. Since the protruding portion 42 of the pseudo write protection member 14 is inserted into the control opening 21 and engages with the control opening 21, the pseudo write protection member 14 becomes immovable. The pseudo write protection member 14 differs in shape from the write protection member 13. Furthermore, if pseudo write protection member 14 is differentiated in color from the cartridge case 4, it can be easily identified.

While the present invention has been described with reference to the preferred embodiment thereof, the invention is not to be limited to the details given herein, but may be modified within the scope of the invention hereinafter claimed.

What is claimed is:

1. A structure for identifying a recording medium cartridge in which a recording medium is housed within a cartridge case, comprising:

an opening formed in said cartridge case;

a slidable write protection member, installed in said opening, for either permitting or inhibiting data being written to said recording medium;

a recognition window formed in said slidable write protection member; and an identification display, installed within said cartridge case, which is visible through said recognition window.

2. The structure as set forth in claim 1, wherein, when said slidable write protection member is at a write enable position, the recognition window of said slidable write protection member faces the opening of said cartridge case so that said identification display can be recognized.

3. The structure as set forth in claim 1, wherein said identification display is provided so that it can be visually observed by color display or symbol display, performed on said cartridge case by putting leaf, printing, or a relief.

4. The structure set forth in claim 1, wherein said slidable write protection member includes a control rib protrusion, said control rib protrusion enabling the slidable protection member to be moved by a finger.

5. The structure set forth in claim 4, further wherein said control rib protrusion is slidable the distance of said opening.

6. The structure set forth in claim 5, further wherein the edges of said opening are inclined to permit easy manipulation of said control rib protrusion by a finger even when said control rib protrusion lies against an edge of said cartridge case.

* * * * *